(12) United States Patent
Silvernail et al.

(10) Patent No.: US 9,051,475 B2
(45) Date of Patent: *Jun. 9, 2015

(54) RHEOLOGY MODIFIED PRETREATMENT COMPOSITIONS AND ASSOCIATED METHODS OF USE

(71) Applicant: PPG Industries Ohio, Inc., Cleveland, OH (US)

(72) Inventors: Nathan J. Silvernail, Allison Park, PA (US); Thor G. Lingenfelter, Evans City, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/459,359

(22) Filed: Aug. 14, 2014

(65) Prior Publication Data

US 2014/0356617 A1    Dec. 4, 2014

Related U.S. Application Data

(63) Continuation of application No. 13/249,355, filed on Sep. 30, 2011, now Pat. No. 8,852,357.

(51) Int. Cl.
| | |
|---|---|
| *C23C 22/00* | (2006.01) |
| *C23C 22/05* | (2006.01) |
| *C23C 22/06* | (2006.01) |
| *C23C 22/34* | (2006.01) |
| *C23C 22/73* | (2006.01) |
| *C23C 22/76* | (2006.01) |
| *C23C 22/83* | (2006.01) |
| *C25D 13/20* | (2006.01) |
| *C09D 7/00* | (2006.01) |
| *B05D 1/02* | (2006.01) |
| *C09D 1/02* | (2006.01) |
| *B05D 5/00* | (2006.01) |
| *B05D 7/14* | (2006.01) |
| *C09D 1/00* | (2006.01) |

(52) U.S. Cl.
CPC ........... *C09D 1/02* (2013.01); *Y10T 428/12778* (2015.01); *Y10T 428/265* (2015.01); *C23C 22/34* (2013.01); *C23C 22/73* (2013.01); *C23C 22/76* (2013.01); *C23C 22/83* (2013.01); *C25D 13/20* (2013.01); *C09D 7/004* (2013.01); *B05D 5/00* (2013.01); *B05D 7/14* (2013.01); *C09D 1/00* (2013.01); *C09D 7/002* (2013.01)

(58) Field of Classification Search
USPC ................... 106/14.05, 14.44; 148/243, 247; 427/327, 385.5, 402, 421.1; 428/457, 428/458, 469
See application file for complete search history.

(56) References Cited

U.S. PATENT DOCUMENTS

| | | | |
|---|---|---|---|
| 2,672,449 | A | 3/1954 | Snell et al. |
| 3,455,806 | A | 7/1969 | Spoor et al. |
| 3,663,389 | A | 5/1972 | Koral et al. |
| 3,749,657 | A | 7/1973 | Le Bras et al. |
| 3,793,278 | A | 2/1974 | De Bona |
| 3,912,548 | A | 10/1975 | Faigen |
| 3,947,338 | A | 3/1976 | Jerabek et al. |
| 3,947,339 | A | 3/1976 | Jerabek et al. |
| 3,962,165 | A | 6/1976 | Bosso et al. |
| 3,975,346 | A | 8/1976 | Bosso et al. |
| 3,984,299 | A | 10/1976 | Jerabek |
| 4,001,101 | A | 1/1977 | Bosso et al. |
| 4,116,900 | A | 9/1978 | Belanger |
| 4,134,866 | A | 1/1979 | Tominaga et al. |
| 4,134,932 | A | 1/1979 | Kempter et al. |
| 4,304,693 | A | 12/1981 | Boberski et al. |
| 4,466,832 | A | 8/1984 | Yoshimura et al. |
| 4,532,066 | A | 7/1985 | Paszek et al. |
| 4,647,479 | A | 3/1987 | Montes |
| 4,824,589 | A | 4/1989 | Magyar et al. |
| 5,034,358 | A | 7/1991 | MacMillan |
| 5,294,265 | A | 3/1994 | Gray et al. |
| 5,306,523 | A | 4/1994 | Shibata |
| 5,328,525 | A | 7/1994 | Musingo et al. |
| 5,380,354 | A | 1/1995 | Chalkley et al. |
| 5,449,415 | A | 9/1995 | Dolan |
| 5,653,823 | A | 8/1997 | McMillen et al. |
| 5,653,917 | A | 8/1997 | Singerman |
| 5,662,746 | A | 9/1997 | Affinito |
| 5,688,435 | A | 11/1997 | Chang et al. |
| 5,743,971 | A | 4/1998 | Inoue et al. |
| 5,938,861 | A | 8/1999 | Inoue et al. |
| 6,214,450 | B1 | 4/2001 | Wickert et al. |
| 6,514,350 | B1 | 2/2003 | Libutti et al. |

(Continued)

FOREIGN PATENT DOCUMENTS

| | | |
|---|---|---|
| CA | 2087352 A1 | 1/1994 |
| DE | 2707405 A1 | 1/1978 |

(Continued)

OTHER PUBLICATIONS

"58935 Laponite(R) RD"; http://www.kremer-pigmente.de/shopint/info/en_international/58935e.htm; Dec. 13, 2010; one page; Kremer Pigmente GmbH & Co. KG.

(Continued)

*Primary Examiner* — Anthony J Green
(74) *Attorney, Agent, or Firm* — Charles M. Yeomans; Alicia M. Passerin

(57) ABSTRACT

Disclosed are methods for treating metal substrates that include contacting the metal with pretreatment compositions comprising: (a) a group IIIB metal, a group IVB metal and/or a group VB metal; and (b) a rheology modifier composition.

20 Claims, No Drawings

(56) References Cited

U.S. PATENT DOCUMENTS

| | | | |
|---|---|---|---|
| 6,875,800 B2 | 4/2005 | Vanier et al. | |
| 6,894,086 B2 | 5/2005 | Munrom et al. | |
| 7,112,621 B2 * | 9/2006 | Rohrbaugh et al. | 523/207 |
| 7,199,094 B2 | 4/2007 | Cheung et al. | |
| 7,351,295 B2 | 4/2008 | Pawlik et al. | |
| 7,435,765 B2 * | 10/2008 | McCovick et al. | 523/160 |
| 7,462,582 B2 * | 12/2008 | Komiyama et al. | 508/136 |
| 7,531,051 B2 | 5/2009 | Nakayama et al. | |
| 7,605,194 B2 | 10/2009 | Ferencz et al. | |
| 7,612,124 B2 | 11/2009 | Polk et al. | |
| 7,635,727 B2 | 12/2009 | Faler et al. | |
| 7,671,109 B2 | 3/2010 | Cheng et al. | |
| 7,745,514 B2 | 6/2010 | Cheng et al. | |
| 7,754,786 B2 | 7/2010 | Ferencz et al. | |
| 7,887,938 B2 | 2/2011 | Fristad et al. | |
| 7,909,944 B2 | 3/2011 | Inbe et al. | |
| 8,153,344 B2 | 4/2012 | Faler et al. | |
| 8,557,895 B2 | 10/2013 | Ferencz et al. | |
| 8,852,357 B2 | 10/2014 | Silvernail et al. | |
| 2002/0037822 A1 | 3/2002 | Foley et al. | |
| 2004/0163735 A1 | 8/2004 | Matsukawa et al. | |
| 2004/0163736 A1 | 8/2004 | Matsukawa et al. | |
| 2004/0170840 A1 | 9/2004 | Matsukawa et al. | |
| 2005/0067057 A1 | 3/2005 | Ishikura et al. | |
| 2005/0272622 A1 | 12/2005 | Hariharan et al. | |
| 2005/0287348 A1 | 12/2005 | Faler et al. | |
| 2006/0011885 A1 | 1/2006 | Christmas et al. | |
| 2006/0076299 A1 | 4/2006 | Feng et al. | |
| 2006/0079424 A1 | 4/2006 | Perry | |
| 2007/0272099 A1 | 11/2007 | Pointl | |
| 2008/0057304 A1 | 3/2008 | Fristad et al. | |
| 2008/0112909 A1 | 5/2008 | Faler et al. | |
| 2009/0197786 A1 | 8/2009 | Perry et al. | |
| 2010/0031851 A1 | 2/2010 | Inbe et al. | |
| 2010/0056415 A1 | 3/2010 | Rong et al. | |
| 2011/0041957 A1 | 2/2011 | Brouwer et al. | |
| 2012/0189485 A1 | 7/2012 | Pawlik et al. | |

FOREIGN PATENT DOCUMENTS

| | | |
|---|---|---|
| DE | 102009039887 A1 | 3/2011 |
| EP | 396240 A1 | 11/1990 |
| EP | 0760401 A1 | 3/1997 |
| EP | 1246363 A1 | 10/2002 |
| EP | 1322740 B1 | 9/2009 |
| EP | 2166075 A1 | 3/2010 |
| GB | 956927 A | 4/1964 |
| WO | 8505131 A1 | 11/1985 |
| WO | 9533869 A1 | 12/1995 |
| WO | 9627654 A1 | 9/1996 |
| WO | 0032351 A2 | 6/2000 |
| WO | 2004063414 A2 | 7/2004 |
| WO | 2008080746 A2 | 7/2008 |
| WO | 2009100226 A1 | 8/2009 |

OTHER PUBLICATIONS

"Hectorite Mineral Data", http://webmineral.com/data/Hectorite.shtml; Apr. 12, 2011; four pages.

"Laponite(R)—Performance-Focused Attributes in Rheology and Specialty Film Forming Applications", ChemBrief; Jun. 2011; two pages; vol. 1, Issue 2; Southern Clay Products, Inc., Gonzales, Texas 78629, United States of America.

"What is Bentonite?", http://www.bentonite.us/; Apr. 12, 2011; one page.

* cited by examiner

RHEOLOGY MODIFIED PRETREATMENT COMPOSITIONS AND ASSOCIATED METHODS OF USE

CROSS-REFERENCE TO RELATED APPLICATIONS

This is a continuation of U.S. patent application Ser. No. 13/249,355, filed on Sep. 30, 2011, entitled "Rheology Modified Pretreatment Compositions and Associated Methods of Use," now U.S. Pat. No. 8,852,357.

STATEMENT REGARDING FEDERALLY SPONSORED RESEARCH

This invention was made with Government support under Contract No. W912HQ-09-C-0038 awarded by SERDP. The United States Government may have certain rights in this invention.

FIELD OF THE INVENTION

The present invention relates to pretreatment compositions, methods for treating a metal substrate, including aluminum containing substrates and ferrous substrates, such as cold rolled steel and electrogalvanized steel. The present invention also relates to coated metal substrates.

BACKGROUND INFORMATION

The use of protective coatings on metal substrates for improved corrosion resistance and paint adhesion is common. Conventional techniques for coating such substrates include techniques that involve pretreating the metal substrate with a pretreatment composition and/or with an electrodepositable coating composition.

During processing or simply upon exposure to the atmosphere after pretreating, a metal oxide layer, i.e., rust, is often formed over all or part of pretreated metal surface, thereby impairing its appearance and/or suitability for further use.

It would, therefore, be desirable to provide methods for preventing or minimizing rust on a pretreated substrate, including those that are oriented in a substantially vertical fashion.

SUMMARY OF THE INVENTION

In certain respects, the present invention is directed to pretreatment compositions for treating a metal substrate comprising: (a) a group IIIB metal, a group IVB metal and/or a group VB metal; and (b) a rheology modifier composition.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As previously mentioned, certain embodiments of the present invention are directed to methods for treating a metal substrate. Suitable metal substrates for use in the present invention include those that are often used in the assembly of automotive bodies, automotive parts, and other articles, such as small metal parts, including fasteners, i.e., nuts, bolts, screws, pins, nails, clips, buttons, and the like. Specific examples of suitable metal substrates include, but are not limited to, cold rolled steel, hot rolled steel, steel coated with zinc metal, zinc compounds, or zinc alloys, such as electrogalvanized steel, hot-dipped galvanized steel, galvanealed steel, and steel plated with zinc alloy. Also, aluminum alloys, aluminum plated steel and aluminum alloy plated steel substrates may be used. Other suitable non-ferrous metals include copper and magnesium, as well as alloys of these materials. Moreover, the bare metal substrate being coating by the methods of the present invention may be a cut edge of a substrate that is otherwise treated and/or coated over the rest of its surface. The metal substrate coated in accordance with the methods of the present invention may be in the form of, for example, a sheet of metal or a fabricated part.

The substrate to be treated in accordance with the methods of the present invention may first be cleaned to remove grease, dirt, or other extraneous matter. This is often done by employing mild or strong alkaline cleaners, such as are commercially available and conventionally used in metal pretreatment processes. Examples of alkaline cleaners suitable for use in the present invention include Chemkleen 163, Chemkleen 177, and Chemkleen 490MX, each of which is commercially available from PPG Industries, Inc. Such cleaners are often followed and/or preceded by a water rinse.

As previously indicated, certain embodiments of the present invention are directed to methods treating a metal substrate that comprise contacting the metal substrate with a pretreatment composition comprising a group IIIB metal, a group IVB metal and/or a group VB metal and a rheology modifier. As used herein, the term "pretreatment composition" refers to a composition that upon contact with the substrate, reacts with and chemically alters the substrate surface and binds to it to form a protective layer.

Often, the pretreatment composition comprises a carrier, often an aqueous medium, so that the composition is in the form of a solution or dispersion of a group IIIB metal, a group IVB metal and/or a group VB metal in the carrier. In these embodiments, the solution or dispersion may be brought into contact with the substrate by any of a variety of known techniques, such as dipping or immersion, spraying, intermittent spraying, dipping followed by spraying, spraying followed by dipping, brushing, or roll-coating. In certain embodiments, the solution or dispersion when applied to the metal substrate is at a temperature ranging from 60 to 150° F. (15 to 65° C.). The contact time is often from 10 seconds to 30 minutes, such as 30 seconds to 10 minutes.

As noted above, in certain embodiments, the pretreatment composition also comprises a rheology modifier. As used herein, the term "rheology modifier" refers to a material that, when added to the pretreatment composition, produces a thickened composition with a highly shear thinning, thixotropic rheology. As a result, the pretreatment composition is sprayable using typical spray devices (including those mentioned below) and yet, it has been discovered, remains on the surface, even if the surface is oriented substantially vertically. As used herein, the term "substantially vertically" means substantially perpendicular (i.e., within ±20% from perpendicular) to the ground or other surface upon which the ferrous metal-containing surface is disposed.

In certain of these embodiments, the rheology modifier comprises a colloidal layered silicate, often referred to as synthetic hectorite clay. Colloidal layered silicates that are suitable for use in the compositions described herein include, for example, LAPONITE RD, LAPONITE RDS, LAPONITE XL21 and LAPONITE JS, including combinations thereof. LAPONITE RD is a free flowing synthetic layered silicate having a bulk density of 1,000 kg/m$^3$, a surface area (BET) of 370 m$^2$/g, a pH of a 2% suspension in water of 9.8, wherein the composition on a dry basis by weight is 59.5% $SiO_2$, 27.5% MgO, 0.8% $Li_2O$, and 2.8% $Na_2O$. LAPONITE RDS is also a free flowing a free flowing synthetic layered silicate having a bulk density of 1,000 kg/m$^3$, a surface area (BET) of 330 m$^2$/g, a pH of a 2% suspension in water of 9.7, wherein the composition on a dry basis by weight is 54.5% $SiO_2$, 26.0% MgO, 0.8% $Li_2O$, 5.6% $Na_2O$, and 4.1% $P_2O_5$. LAPONITE XL21 is sodium magnesium fluorosilicate. The particle size of the colloidal layered silicates, such as those described above, is typically 1 to 30 nanometers in average diameter.

In certain embodiments, the colloidal layered silicate is present in the composition used in the methods of the present invention in an amount of at least 1 percent by weight, such as at least 2 percent by weight, or, in some cases, at least 3 percent by weight, with the weight percents being based on the total weight of the composition. In certain embodiments, the colloidal layered silicate is present in the composition used in the methods of the present invention in an amount of no more than 10 percent by weight, such as no more than 6 percent by weight, or, in some cases, no more than 5 percent by weight, with the weight percents being based on the total weight of the composition.

Indeed, it was a surprising discovery that the use of rheology modifiers as defined herein such as synthetic hectorite clay, as opposed to other thickening agents, including other thixotropic clays (such as kaolin and bentonite clays), produces a pretreatment composition that is both sprayable at ambient conditions and remains in contact with the substrate surface even when the surface is oriented substantially vertically. By maintaining the pretreatment composition, and specifically the group IIIB, IVB and/or group VB metal, in constant contact with the substrate surface, surface drying and flash rusting on the substrate surface are substantially reduced or prevented. As used herein, "ambient conditions" refers to 23° C. and atmospheric pressure.

As used herein, the term "group IIIB, IVB and/or group VB metal" refers to an element that is in group IIIB or group IVB of the CAS Periodic Table of the Elements as is shown, for example, in the Handbook of Chemistry and Physics, 63$^{rd}$ edition (1983). Where applicable, the metal themselves may be used. In certain embodiments, a group IIIB, IVB and/or group VB metal compound is used. As used herein, the term "group IIIB, IVB and/or group VB metal compound" refers to compounds that include at least one element that is in group IIIB or group IVB or group VB of the CAS Periodic Table of the Elements.

In certain embodiments, the group IIIB, IVB and/or group VB metal compound used in the pretreatment composition is a compound of zirconium, titanium, hafnium, yttrium, cerium, vanadium, or a mixture thereof. Suitable compounds of zirconium include, but are not limited to, hexafluorozirconic acid, alkali metal and ammonium salts thereof, ammonium zirconium carbonate, zirconyl nitrate, zirconium carboxylates and zirconium hydroxy carboxylates, such as hydrofluorozirconic acid, zirconium acetate, zirconium oxalate, ammonium zirconium glycolate, ammonium zirconium lactate, ammonium zirconium citrate, and mixtures thereof. Suitable compounds of titanium include, but are not limited to, fluorotitanic acid and its salts. A suitable compound of hafnium includes, but is not limited to, hafnium nitrate. A suitable compound of yttrium includes, but is not limited to, yttrium nitrate. A suitable compound of cerium includes, but is not limited to, cerous nitrate.

In certain embodiments, the group IIIB, IVB and/or group VB metal compound is present in the pretreatment composition in an amount of at least 10 ppm metal, such as at least 100 ppm metal, or, in some cases, at least 150 ppm metal. In certain embodiments, the group IIIB, IVB and/or group VB metal compound is present in the pretreatment composition in an amount of no more than 5000 ppm metal, such as no more than 1000 ppm metal, or, in some cases, no more than 500 ppm metal. The amount of group IIIB, IVB and/or group VB metal in the pretreatment composition can range between any combinations of the recited values inclusive of the recited values.

In certain embodiments, the pretreatment composition also comprises an electropositive metal that is not a group IIIB, IVB and/or group VB metal. As used herein, the term "electropositive metal" refers to metals that are more electropositive than the metal substrate. This means that, for purposes of the present invention, the term "electropositive metal" encompasses metals that are less easily oxidized than the metal of the metal substrate. As will be appreciated by those skilled in the art, the tendency of a metal to be oxidized is called the oxidation potential, is expressed in volts, and is measured relative to a standard hydrogen electrode, which is arbitrarily assigned an oxidation potential of zero. The oxidation potential for several elements is set forth in the table below. An element is less easily oxidized than another element if it has a voltage value, E*, in the following table, that is greater than the element to which it is being compared.

| Element | Half-cell reaction | Voltage, E* |
|---|---|---|
| Potassium | $K^+ + e \rightarrow K$ | −2.93 |
| Calcium | $Ca^{2+} + 2e \rightarrow Ca$ | −2.87 |
| Sodium | $Na^+ + e \rightarrow Na$ | −2.71 |
| Magnesium | $Mg^{2+} + 2e \rightarrow Mg$ | −2.37 |
| Aluminum | $Al^{3+} + 3e \rightarrow Al$ | −1.66 |

-continued

| Element | Half-cell reaction | Voltage, E* |
|---|---|---|
| Zinc | $Zn^{2+} + 2e \rightarrow Zn$ | −0.76 |
| Iron | $Fe^{2+} + 2e \rightarrow Fe$ | −0.44 |
| Nickel | $Ni^{2+} + 2e \rightarrow Ni$ | −0.25 |
| Tin | $Sn^{2+} + 2e \rightarrow Sn$ | −0.14 |
| Lead | $Pb^{2+} + 2e \rightarrow Pb$ | −0.13 |
| Hydrogen | $2H^+ + 2e \rightarrow H_2$ | −0.00 |
| Copper | $Cu^{2+} + 2e \rightarrow Cu$ | 0.34 |
| Mercury | $Hg_2^{2+} + 2e \rightarrow 2Hg$ | 0.79 |
| Silver | $Ag^+ + e \rightarrow Ag$ | 0.80 |
| Gold | $Au^{3+} + 3e \rightarrow Au$ | 1.50 |

Thus, as will be apparent, when the metal substrate comprises one of the materials listed earlier, such as cold rolled steel, hot rolled steel, steel coated with zinc metal, zinc compounds, or zinc alloys, hot-dipped galvanized steel, galvannealed steel, steel plated with zinc alloy, aluminum alloys, aluminum plated steel, aluminum alloy plated steel, magnesium and magnesium alloys, suitable electropositive metals for deposition thereon in accordance with the present invention include, for example, nickel, copper, silver, and gold, as well mixtures thereof.

In certain embodiments, the source of electropositive metal in the pretreatment composition is a water soluble metal salt. In certain embodiments of the present invention, the water soluble metal salt is a water soluble copper compound. Specific examples of water soluble copper compounds, which are suitable for use in the present invention include, but are not limited to, copper cyanide, copper potassium cyanide, copper sulfate, copper nitrate, copper pyrophosphate, copper thiocyanate, disodium copper ethylenediaminetetraacetate tetrahydrate, copper bromide, copper oxide, copper hydroxide, copper chloride, copper fluoride, copper gluconate, copper citrate, copper lauroyl sarcosinate, copper formate, copper acetate, copper propionate, copper butyrate, copper lactate, copper oxalate, copper phytate, copper tartarate, copper malate, copper succinate, copper malonate, copper maleate, copper benzoate, copper salicylate, copper aspartate, copper glutamate, copper fumarate, copper glycerophosphate, sodium copper chlorophyllin, copper fluorosilicate, copper fluoroborate and copper iodate, as well as copper salts of carboxylic acids in the homologous series formic acid to decanoic acid, copper salts of polybasic acids in the series oxalic acid to suberic acid, and copper salts of hydroxycarboxylic acids, including glycolic, lactic, tartaric, malic and citric acids.

When copper ions supplied from such a water-soluble copper compound are precipitated as an impurity in the form of copper sulfate, copper oxide, etc., it may be preferable to add a complexing agent that suppresses the precipitation of copper ions, thus stabilizing them as a copper complex in the solution.

In certain embodiments, the copper compound is added as a copper complex salt such as $K_3Cu(CN)_4$ or Cu-EDTA, which can be present stably in the composition on its own, but it is also possible to form a copper complex that can be present stably in the composition by combining a complexing agent with a compound that is difficultly soluble on its own. Examples thereof include a copper cyanide complex formed by a combination of CuCN and KCN or a combination of CuSCN and KSCN or KCN, and a Cu-EDTA complex formed by a combination of $CuSO_4$ and EDTA.2Na.

With regard to the complexing agent, a compound that can form a complex with copper ions can be used; examples thereof include inorganic compounds, such as cyanide compounds and thiocyanate compounds, and polycarboxylic acids, and specific examples thereof include ethylenediaminetetraacetic acid, salts of ethylenediaminetetraacetic acid, such as dihydrogen disodium ethylenediaminetetraacetate dihydrate, aminocarboxylic acids, such as nitrilotriacetic acid and iminodiacetic acid, oxycarboxylic acids, such as citric acid and tartaric acid, succinic acid, oxalic acid, ethylenediaminetetramethylenephosphonic acid, and glycine.

In certain embodiments, the electropositive metal, such as copper, is included in the pretreatment compositions in an amount of at least 1 ppm, such as at least 5 ppm, or in some cases, at least 10 ppm of total metal (measured as elemental metal). In certain embodiments, the electropositive metal is included in such pretreatment compositions in an amount of no more than 500 ppm, such as no more than 100 ppm, or in some cases, no more than 50 ppm of total metal (measured as elemental metal). The amount of electropositive metal in the pretreatment composition can range between any combinations of the recited values inclusive of the recited values.

In some embodiments, the pretreatment composition may be a silane or a non-crystalline phosphate, such as iron phosphate, containing pretreatment composition. Suitable silane containing pretreatment compositions include, but are not limited to, certain commercially available products, such as Silquest A-1100 Silane, which is commercially available from Momentive Performance Materials. Suitable non-crystalline phosphate containing pretreatment composition include pretreatment composition that comprise, iron phosphate, manganese phosphate, calcium phosphate, magnesium phosphate, cobalt phosphate, or an organophosphate and/or organophosphonate, such as is disclosed in U.S. Pat. No. 5,294,265 at col. 1, line 53 to col. 3, line 12 and U.S. Pat. No. 5,306,526 at col. 1, line 46 to col. 3, line 8, the cited portions of which being incorporated herein by reference. Suitable non-crystalline phosphate containing pretreatment compositions are commercially available, such as Chemfos® 158 and Chemfos® 51, which are iron phosphate pretreatment compositions commercially available from PPG Industries, Inc.

In certain embodiments, the pretreatment composition comprises a resinous binder. Suitable resins include reaction products of one or more alkanolamines and an epoxy-functional material containing at least two epoxy groups, such as those disclosed in U.S. Pat. No. 5,653,823. In some cases, such resins contain beta hydroxy ester, imide, or sulfide functionality, incorporated by using dimethylolpropionic acid, phthalimide, or mercaptoglycerine as an additional reactant in the preparation of the resin. Alternatively, the reaction product is that of the diglycidyl ether of Bisphenol A (commercially available from Shell Chemical Company as EPON 880), dimethylol propionic acid, and diethanolamine in a 0.6 to 5.0:0.05 to 5.5:1 mole ratio. Other suitable resinous binders include water soluble and water dispersible polyacrylic acids as disclosed in U.S. Pat. Nos. 3,912,548 and 5,328,525; phenol formaldehyde resins as described in U.S. Pat. No. 5,662,746; water soluble polyamides such as those disclosed in WO 95/33869; copolymers of maleic or acrylic acid with allyl ether as described in Canadian patent application 2,087,352; and water soluble and dispersible resins including epoxy resins, aminoplasts, phenol-formaldehyde resins, tannins, and polyvinyl phenols as discussed in U.S. Pat. No. 5,449,415.

In these embodiments of the present invention, the resinous binder is present in the pretreatment composition in an amount of 0.005 percent to 30 percent by weight, such as 0.5 to 3 percent by weight, based on the total weight of the ingredients in the composition.

In other embodiments, however, the pretreatment composition is substantially free or, in some cases, completely free of any resinous binder. As used herein, the term "substantially free", when used with reference to the absence of resinous binder in the pretreatment composition, means that any resinous binder is present in the pretreatment composition in an amount of less than 0.005 percent by weight. As used herein, the term "completely free" means that there is no resinous binder in the pretreatment composition at all.

In certain embodiments, the pH of the pretreatment composition may be adjusted to a pH between 2 and 8, such as between 4 and 6, such as to a pH of 5, with one or more acids. Suitable acids that may be utilized include organic acids and/or mineral acids.

In certain embodiment, the organic acid comprises a carboxylic acid. In certain embodiments, the carboxylic acid has a water solubility of >1 g/L at 20° C. Carboxylic acids suitable for use include, for example, monocarboxylic acids, such as formic acid, acetic acid, propionic acid, methylacetic acid, butyric acid, ethylacetic acid, n-valeric acid, n-butanecarboxylic acid, acrylic acid, propiolic acid, methacrylic acid, palmitic acid, stearic acid, oleic acid, linolic acid, and linolenic acid; dicarboxylic acids, such as oxalic acid, malonic acid, succinic acid, glutaric acid, adipic acid, pimelic acid, suberic acid, azelaic acid, lepargilic acid, sebacic acid, maleic acid, and fumaric acid; aliphatic hydroxy acids, such as glycolic acid, lactic acid, tartronic acid, glyceric acid, malic acid, tartaric acid, citramalic acid, citric acid, isocitric acid, leucine acid, mevalonic acid, pantoic acid, recinoleic acid, ricinelaidic acid, cerebronic acid, quinic acid, and shikimic acid; aromatic hydroxy acids, such as salicylic acid, creosote acid, vanillic acid, syringic acid, pyrocatechuic acid, resorcylic acid, protocatechuic acid, gentisic acid, orsellinic acid, gallic acid, mandelic acid, benzilic acid, atrolactinic acid, melilotic acid, phloretic acid, coumaric acid, umbellic acid, caffeic acid, ferulic acid, and sinapic acid. Mixtures of any of the foregoing may also be used.

Mineral acids suitable for use to adjust the pH include, for example, phosphoric acid, hydrofluoric acid, hydrochloric acid, sulfuric acid, and nitric acid. Mixtures of any of the foregoing may also be used.

In certain of these embodiments, the acid is added prior to the addition of the group IIIB, group IVB and/or group VB metal.

In certain embodiments, the pretreatment solution is formed by first adding the rheology modifier composition, such as the colloidal layered silicate, to an aqueous medium while stirring. The pH of the resultant solution is then adjusted to between 2 and 8 using one or more acids from the group of acids described above. The group IIIB, group IVB and/or group VB metal (or metal compound) is then added to the pH adjusted solution, followed by the electropositive metal and/or any other optional materials, such as complexing agents, silanes or non-crystalline phosphate, or a resinous binder (described above or below).

The pretreatment composition may optionally contain other materials, such as nonionic surfactants and auxiliaries conventionally used in the art of pretreatment. In an aqueous medium, water dispersible organic solvents, for example, alcohols with up to about 8 carbon atoms, such as methanol, isopropanol, and the like, may be present; or glycol ethers such as the monoalkyl ethers of ethylene glycol, diethylene glycol, or propylene glycol, and the like. When present, water dispersible organic solvents are typically used in amounts up to about ten percent by volume, based on the total volume of aqueous medium.

Other optional materials include surfactants that function as defoamers or substrate wetting agents, such as those materials and amounts described earlier with respect to the plating solution.

In certain embodiments, the pretreatment composition also comprises a reaction accelerator, such as nitrite ions, nitrogroup containing compounds, hydroxylamine sulfate, persulfate ions, sulfite ions, hyposulfite ions, peroxides, iron (III) ions, citric acid iron compounds, bromate ions, perchlorinate ions, chlorate ions, chlorite ions as well as ascorbic acid, citric acid, tartaric acid, malonic acid, succinic acid and salts thereof. Specific examples of suitable materials and their amounts are described in United States Patent Application Publication No. 2004/0163736 A1 at [0032] to [0041], the cited portion of which being incorporated herein by reference.

In certain embodiments, the pretreatment composition also comprises a filler, such as a siliceous filler. Non-limiting examples of suitable fillers include silica, mica, montmorillonite, kaolinite, asbestos, talc, diatomaceous earth, vermiculite, natural and synthetic zeolites, cement, calcium silicate, aluminum silicate, sodium aluminum silicate, aluminum polysilicate, alumina silica gels, and glass particles. In addition to the siliceous fillers other finely divided particulate substantially water-insoluble fillers may also be employed. Examples of such optional fillers include carbon black, charcoal, graphite, titanium oxide, iron oxide, copper oxide, zinc oxide, antimony oxide, zirconia, magnesia, alumina, molybdenum disulfide, zinc sulfide, barium sulfate, strontium sulfate, calcium carbonate, and magnesium carbonate.

As indicated, in certain embodiments, the pretreatment composition is substantially or, in some cases, completely free of chromate and/or heavy metal phosphate. As used herein, the term "substantially free" when used in reference to the absence of chromate and/or heavy metal phosphate, such as zinc phosphate, in the pretreatment composition means that these substances are not present in the composition to such an extent that they cause a burden on the environment. That is, they are not substantially used and the formation of sludge, such as zinc phosphate, formed in the case of using a treating agent based on zinc phosphate, is eliminated.

Moreover, in certain embodiments, the pretreatment composition is substantially free, or, in some cases, completely free of any organic materials. As used herein, the term "substantially free", when used with reference to the absence of organic materials in the composition, means that any organic materials are present in the composition, if at all, as an incidental impurity. In other words, the presence of any organic material does not affect the properties of the composition. As used herein, the term "completely free" means that there is no organic material in the composition at all.

In certain embodiments, the film coverage of the residue of the pretreatment coating composition generally ranges from 1 to 1000 milligrams per square meter ($mg/m^2$), such as 10 to 400 $mg/m^2$. The thickness of the pretreatment coating can vary, but it is generally very thin, often having a thickness of less than 1 micrometer, in some cases it is from 1 to 500 nanometers, and, in yet other cases, it is 10 to 300 nanometers.

In certain embodiments of the methods of the present invention, after the substrate is contacted with the pretreatment composition, it is then contacted with a coating composition comprising a film-forming resin.

As used herein, the term "film-forming resin" refers to resins that can form a self-supporting continuous film on at least a horizontal surface of a substrate upon removal of any diluents or carriers present in the composition or upon curing at ambient or elevated temperature. Conventional film-forming resins that may be used include, without limitation, those typically used in automotive OEM coating compositions, automotive refinish coating compositions, industrial coating compositions, architectural coating compositions, coil coating compositions, and aerospace coating compositions, among others.

In certain embodiments, the coating composition comprises a thermosetting film-forming resin. As used herein, the term "thermosetting" refers to resins that "set" irreversibly upon curing or crosslinking, wherein the polymer chains of the polymeric components are joined together by covalent bonds. This property is usually associated with a cross-linking reaction of the composition constituents often induced, for example, by heat or radiation. Curing or crosslinking reactions also may be carried out under ambient conditions. Once cured or crosslinked, a thermosetting resin will not melt upon the application of heat and is insoluble in solvents. In other embodiments, the coating composition comprises a thermoplastic film-forming resin. As used herein, the term "thermoplastic" refers to resins that comprise polymeric components that are not joined by covalent bonds and thereby can undergo liquid flow upon heating and are soluble in solvents.

In certain embodiments, the coating composition is part of a multi-layer coating composition applied to the pretreated substrate. The coating layers could include an electrocoating layer formed from an electrodepositable coating composition (such as those described below), suitable top coat layers (e.g., base coat, clear coat layer, pigmented monocoat, and color-plus-clear composite compositions). It is understood that suitable topcoat layers include any of those known in the art, and each independently may be waterborne, solventborne, in solid particulate form (i.e., a powder coating composition), or in the form of a powder slurry. The top coat typically includes the film-forming resin as described above, crosslinking material and, if a colored base coat or monocoat is utilized, one or more pigments. In certain embodiments, one or more of the topcoat layers are applied onto a substantially uncured underlying layer. For example, in some embodiments, a clear coat layer is applied onto at least a portion of a substantially uncured basecoat layer (wet-on-wet), and both layers are simultaneously cured in a downstream process. Suitable other coating layers thus can include automotive coatings, automotive refinish coatings, and/or CARC (chemical agent resistant coatings) coating compositions.

As previously indicated, in certain embodiments, the substrate is contacted with a coating composition comprising a film-forming resin by an electrocoating step wherein an electrodepositable composition is deposited onto the metal substrate by electrodeposition. In the process of electrodeposition, the metal substrate being treated, serving as an electrode, and an electrically conductive counter electrode are placed in contact with an ionic, electrodepositable composition. Upon passage of an electric current between the electrode and counter electrode while they are in contact with the electrodepositable composition, an adherent film of the electrodepositable composition will deposit in a substantially continuous manner on the metal substrate.

Electrodeposition is usually carried out at a constant voltage in the range of from 1 volt to several thousand volts, typically between 50 and 500 volts. Current density is usually between 1.0 ampere and 15 amperes per square foot (10.8 to 161.5 amperes per square meter) and tends to decrease quickly during the electrodeposition process, indicating formation of a continuous self-insulating film.

The electrodepositable composition utilized in certain embodiments of the present invention often comprises a resinous phase dispersed in an aqueous medium wherein the resinous phase comprises: (a) an active hydrogen group-containing ionic electrodepositable resin, and (b) a curing agent having functional groups reactive with the active hydrogen groups of (a).

In certain embodiments, the electrodepositable compositions utilized in certain embodiments of the present invention contain, as a main film-forming polymer, an active hydrogen-containing ionic, often cationic, electrodepositable resin. A wide variety of electrodepositable film-forming resins are known and can be used in the present invention so long as the polymers are "water dispersible," i.e., adapted to be solubilized, dispersed or emulsified in water. The water dispersible polymer is ionic in nature, that is, the polymer will contain anionic functional groups to impart a negative charge or, as is often preferred, cationic functional groups to impart a positive charge.

Examples of film-forming resins suitable for use in anionic electrodepositable compositions are base-solubilized, carboxylic acid containing polymers, such as the reaction product or adduct of a drying oil or semi-drying fatty acid ester with a dicarboxylic acid or anhydride; and the reaction product of a fatty acid ester, unsaturated acid or anhydride and any additional unsaturated modifying materials which are further reacted with polyol. Also suitable are the at least partially neutralized interpolymers of hydroxy-alkyl esters of unsaturated carboxylic acids, unsaturated carboxylic acid and at least one other ethylenically unsaturated monomer. Still another suitable electrodepositable film-forming resin comprises an alkyd-aminoplast vehicle, i.e., a vehicle containing an alkyd resin and an amine-aldehyde resin. Yet another anionic electrodepositable resin composition comprises mixed esters of a resinous polyol, such as is described in U.S. Pat. No. 3,749,657 at col. 9, lines 1 to 75 and col. 10, lines 1 to 13, the cited portion of which being incorporated herein by reference. Other acid functional polymers can also be used, such as phosphatized polyepoxide or phosphatized acrylic polymers as are known to those skilled in the art.

As aforementioned, it is often desirable that the active hydrogen-containing ionic electrodepositable resin (a) is cationic and capable of deposition on a cathode. Examples of such cationic film-forming resins include amine salt group-containing resins, such as the acid-solubilized reaction products of polyepoxides and primary or secondary amines, such as those described in U.S. Pat. Nos. 3,663,389; 3,984,299; 3,947,338; and 3,947,339. Often, these amine salt group-containing resins are used in combination with a blocked isocyanate curing agent. The isocyanate can be fully blocked, as described in U.S. Pat. No. 3,984,299, or the isocyanate can be partially blocked and reacted with the resin backbone, such as is described in U.S. Pat. No. 3,947,338. Also, one-component compositions as described in U.S. Pat. No. 4,134,866 and DE-OS No. 2,707,405 can be used as the film-forming resin. Besides the epoxy-amine reaction products, film-forming resins can also be selected from cationic acrylic resins, such as those described in U.S. Pat. Nos. 3,455,806 and 3,928,157.

Besides amine salt group-containing resins, quaternary ammonium salt group-containing resins can also be employed, such as those formed from reacting an organic polyepoxide with a tertiary amine salt as described in U.S. Pat. Nos. 3,962,165; 3,975,346; and 4,001,101. Examples of other cationic resins are ternary sulfonium salt group-containing resins and quaternary phosphonium salt-group containing resins, such as those described in U.S. Pat. Nos. 3,793,278 and 3,984,922, respectively. Also, film-forming resins which cure via transesterification, such as described in European Application No. 12463 can be used. Further, cationic compositions prepared from Mannich bases, such as described in U.S. Pat. No. 4,134,932, can be used.

In certain embodiments, the resins present in the electrodepositable composition are positively charged resins which contain primary and/or secondary amine groups, such as described in U.S. Pat. Nos. 3,663,389; 3,947,339; and 4,116,900. In U.S. Pat. No. 3,947,339, a polyketimine derivative of a polyamine, such as diethylenetriamine or triethylenetetraamine, is reacted with a polyepoxide. When the reaction product is neutralized with acid and dispersed in water, free primary amine groups are generated. Also, equivalent products are formed when polyepoxide is reacted with excess polyamines, such as diethylenetriamine and triethylenetetraamine, and the excess polyamine vacuum stripped from the reaction mixture, as described in U.S. Pat. Nos. 3,663,389 and 4,116,900.

In certain embodiments, the active hydrogen-containing ionic electrodepositable resin is present in the electrodepositable composition in an amount of 1 to 60 percent by weight, such as 5 to 25 percent by weight, based on total weight of the electrodeposition bath.

As indicated, the resinous phase of the electrodepositable composition often further comprises a curing agent adapted to react with the active hydrogen groups of the ionic electrodepositable resin. For example, both blocked organic polyisocyanate and aminoplast curing agents are suitable for use in the present invention, although blocked isocyanates are often preferred for cathodic electrodeposition.

Aminoplast resins, which are often the preferred curing agent for anionic electrodeposition, are the condensation products of amines or amides with aldehydes. Examples of suitable amine or amides are melamine, benzoguanamine, urea and similar compounds. Generally, the aldehyde employed is formaldehyde, although products can be made from other aldehydes, such as acetaldehyde and furfural. The condensation products contain methylol groups or similar alkylol groups depending on the particular aldehyde employed. Often, these methylol groups are etherified by reaction with an alcohol, such as a monohydric alcohol containing from 1 to 4 carbon atoms, such as methanol, ethanol, isopropanol, and n-butanol. Aminoplast resins are commercially available from American Cyanamid Co. under the trademark CYMEL and from Monsanto Chemical Co. under the trademark RESIMENE.

The aminoplast curing agents are often utilized in conjunction with the active hydrogen containing anionic electrodepositable resin in amounts ranging from 5 percent to 60 percent by weight, such as from 20 percent to 40 percent by weight, the percentages based on the total weight of the resin solids in the electrodepositable composition.

As indicated, blocked organic polyisocyanates are often used as the curing agent in cathodic electrodeposition compositions. The polyisocyanates can be fully blocked as described in U.S. Pat. No. 3,984,299 at col. 1, lines 1 to 68, col. 2, and col. 3, lines 1 to 15, or partially blocked and reacted with the polymer backbone as described in U.S. Pat. No. 3,947,338 at col. 2, lines 65 to 68, col. 3, and col. 4 lines 1 to 30, the cited portions of which being incorporated herein by reference. By "blocked" is meant that the isocyanate groups have been reacted with a compound so that the resultant blocked isocyanate group is stable to active hydrogens at ambient temperature but reactive with active hydrogens in the film forming polymer at elevated temperatures usually between 90° C. and 200° C.

Suitable polyisocyanates include aromatic and aliphatic polyisocyanates, including cycloaliphatic polyisocyanates and representative examples include diphenylmethane-4,4'-diisocyanate (MDI), 2,4- or 2,6-toluene diisocyanate (TDI), including mixtures thereof, p-phenylene diisocyanate, tetramethylene and hexamethylene diisocyanates, dicyclohexylmethane-4,4'-diisocyanate, isophorone diisocyanate, mixtures of phenylmethane-4,4'-diisocyanate and polymethylene polyphenylisocyanate. Higher polyisocyanates, such as triisocyanates can be used. An example would include triphenylmethane-4,4',4"-triisocyanate. Isocyanate ( )-prepolymers with polyols such as neopentyl glycol and trimethylolpropane and with polymeric polyols such as polycaprolactone diols and triols (NCO/OH equivalent ratio greater than 1) can also be used.

The polyisocyanate curing agents are typically utilized in conjunction with the active hydrogen containing cationic electrodepositable resin in amounts ranging from 5 percent to 60 percent by weight, such as from 20 percent to 50 percent by weight, the percentages based on the total weight of the resin solids of the electrodepositable composition.

The electrodepositable compositions described herein are in the form of an aqueous dispersion. The term "dispersion" is believed to be a two-phase transparent, translucent or opaque resinous system in which the resin is in the dispersed phase and the water is in the continuous phase. The average particle size of the resinous phase is generally less than 1.0 and usually less than 0.5 microns, often less than 0.15 micron.

The concentration of the resinous phase in the aqueous medium is often at least 1 percent by weight, such as from 2 to 60 percent by weight, based on total weight of the aqueous dispersion. When such compositions are in the form of resin concentrates, they generally have a resin solids content of 20 to 60 percent by weight based on weight of the aqueous dispersion.

The electrodepositable compositions described herein are often supplied as two components: (1) a clear resin feed, which includes generally the active hydrogen-containing ionic electrodepositable resin, i.e., the main film-forming polymer, the curing agent, and any additional water-dispersible, non-pigmented components; and (2) a pigment paste, which generally includes one or more pigments, a water-dispersible grind resin which can be the same or different from the main-film forming polymer, and, optionally, additives such as wetting or dispersing aids. Electrodeposition bath components (1) and (2) are dispersed in an aqueous medium which comprises water and, usually, coalescing solvents.

As aforementioned, besides water, the aqueous medium may contain a coalescing solvent. Useful coalescing solvents are often hydrocarbons, alcohols, esters, ethers and ketones. The preferred coalescing solvents are often alcohols, polyols and ketones. Specific coalescing solvents include isopropanol, butanol, 2-ethylhexanol, isophorone, 2-methoxypentanone, ethylene and propylene glycol and the monoethyl monobutyl and monohexyl ethers of ethylene glycol. The amount of coalescing solvent is generally between 0.01 and 25 percent, such as from 0.05 to 5 percent by weight based on total weight of the aqueous medium.

In addition, a colorant and, if desired, various additives such as surfactants, wetting agents or catalyst can be included in the coating composition comprising a film-forming resin. As used herein, the term "colorant" means any substance that imparts color and/or other opacity and/or other visual effect to the composition. The colorant can be added to the composition in any suitable form, such as discrete particles, dispersions, solutions and/or flakes. A single colorant or a mixture of two or more colorants can be used.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as phthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in United States Patent Application Publication 2005-0287348 A1, filed Jun. 24, 2004, U.S. Provisional Application No. 60/482,167 filed Jun. 24, 2003, and U.S. patent application Ser. No. 11/337,062, filed Jan. 20, 2006, which is also incorporated herein by reference.

Example special effect compositions that may be used include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In certain embodiments, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain embodiments, a photosensitive composition and/or photochromic composition, which reversibly alters its color when exposed to one or more light sources, can be used in the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In certain embodiments, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In certain embodiments, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with certain embodiments of the present invention, have minimal migration out of the coating. Example photosensitive compositions and/or photochromic compositions and methods for making them are identified in U.S. application Ser. No. 10/892,919 filed Jul. 16, 2004, incorporated herein by reference.

In general, the colorant can be present in the coating composition in any amount sufficient to impart the desired visual and/or color effect. The colorant may comprise from 1 to 65 weight percent, such as from 3 to 40 weight percent or 5 to 35 weight percent, with weight percent based on the total weight of the compositions.

After deposition, the coating is often heated to cure the deposited composition. The heating or curing operation is often carried out at a temperature in the range of from 120 to 250° C., such as from 120 to 190° C. for a period of time ranging from 10 to 60 minutes. In certain embodiments, the thickness of the resultant film is from 10 to 50 microns.

Illustrating the invention are the following examples that are not to be considered as limiting the invention to their details. All parts and percentages in the examples, as well as throughout the specification, are by weight unless otherwise indicated.

EXAMPLES

Coating compositions were prepared as follows:

Cleaner 1: Chemkleen 166 HP/171ALF, alkaline cleaner [commercially available from PPG Industries, Inc.]

Pretreatment 1: CHEMFOS 700/CHEMSEAL 59, immersion applied tricationic Zn phosphate and sealer [commercially available from PPG Industries, Inc.]

Pretreatment 2: Experimental rheology modified zirconium pretreatment with Copper was prepared by dissolving 4% (w/w) Laponite RD in 500 g of H2O and adding 70% nitric acid dropwise to a pH=5. Hexafluorozirconic acid was then added to give a zirconium concentration of 500 ppm. Copper (II) nitrate was also added to give a copper concentration of 20 ppm. After pretreatment in the zirconium pretreatment solution, the panels were rinsed thoroughly with deionized water and then dried with a warm air blowoff.

Pretreatment 3: Experimental rheology modified zirconium pretreatment based on zirconyl acetate was prepared by dissolving 4% (w/w) Laponite RD in 500 g of H2O and adding 70% nitric acid dropwise to a pH=5. Zirconyl acetate was then added to give a zirconium concentration of 500 ppm. After pretreatment in the zirconium pretreatment solution, the panels were rinsed thoroughly with deionized water and then dried with a warm air blowoff.

Pretreatment 4: Experimental rheology modified zirconium pretreatment based on zirconyl nitrate was prepared by dissolving 4% (w/w) Laponite RD in 500 g of H2O and adding 70% nitric acid dropwise to a pH=4. Zirconyl nitrate was then added to give a zirconium concentration of 500 ppm. After pretreatment in the zirconium pretreatment solution, the panels were rinsed thoroughly with deionized water and then dried with a warm air blowoff.

Pretreatment 5: Experimental rheology modified zirconium pretreatment using Laponite OG (a lithium magnesium sodium silicate) was prepared by dissolving 2.75% (w/w) Laponite OG in 1556 g of H2O and adding 70% nitric acid dropwise to a pH=5. Hexafluorozirconic acid was then added to give a zirconium concentration of 1000 ppm. Copper (II) nitrate was also added to give a copper concentration of 40 ppm. After pretreatment in the zirconium pretreatment solution, the panels were rinsed thoroughly with deionized water and then dried with a warm air blowoff.

Pretreatment 6: Experimental rheology modified zirconium pretreatment using Laponite XL21 (a sodium magnesium fluorosilicate) was prepared by dissolving 3% (w/w) Laponite XL21 in 1552 g of H2O and adding 70% nitric acid dropwise to a pH=5. Hexafluorozirconic acid was then added to give a zirconium concentration of 1000 ppm. Copper (II) nitrate was also added to give a copper concentration of 40 ppm. After pretreatment in the zirconium pretreatment solution, the panels were rinsed thoroughly with deionized water and then dried with a warm air blowoff.

Pretreatment 7: Experimental rheology modified zirconium pretreatment using Laponite XL21 (a sodium magnesium fluorosilicate) was prepared by dissolving 2.75% (w/w) Laponite XL21 in 97.25 g of H2O and adding 70% nitric acid dropwise to a pH=5. Hexafluorozirconic acid was then added to give a zirconium concentration of 500 ppm. Copper (II) nitrate was also added to give a copper concentration of 10 ppm.

Pretreatment 8: Experimental rheology modified zirconium pretreatment using Kaolin (naturally occurring clay) was prepared by dissolving 2.75% (w/w) Kaolin (available from VWR International) in 97.25 g of H2O and adding 70% nitric acid dropwise to a pH=5. Hexafluorozirconic acid was then added to give a zirconium concentration of 500 ppm. Copper (II) nitrate was also added to give a copper concentration of 10 ppm.

Pretreatment 9: Experimental rheology modified zirconium pretreatment using Bentonite (naturally occurring clay) was prepared by dissolving 2.75% (w/w) Bentonite (available from VWR International) in 97.25 g of H2O and adding 70% nitric acid dropwise to a pH=5. Hexafluorozirconic acid was then added to give a zirconium concentration of 500 ppm. Copper (II) nitrate was also added to give a copper concentration of 10 ppm.

Paint 1: Amine-catalyzed epoxy made in accordance with United States Military specification Mil-P-53022.

Paint 2: Enviro-Prime® 7000P, a cathodic electrocoat commercially available from PPG Industries.

Test 1: 20 cycles of GM-9511P.

Test 2: 40 cycles of GM-9511P.

Test 3: 500 hrs B117 neutral salt spray (ASTM Standard B117).

Test 4: 20 cycles of GMW14872.

Experimental Procedure:

The coating systems were cleaned using Cleaner 1, rinsed with deionized water, and pretreated using a plastic pipette to coat evenly with the panels in a vertical orientation for 5 minutes at 27° C. Panels were then rinsed with deionized water and dried by for 5 minutes at 55° C. using forced air.

The example coating (Paint 1) composition was applied at 0.0009-0.0011 inch dry film thickness and allowed to cure at ambient conditions for 7 days prior to testing.

The example coating (Paint 2) composition was applied at 0.0008-0.0010 inches and cured for 25 minutes at 175° C. in an electric oven.

Example 1

Scope of Zirconium Compounds

Pretreatment 1 was evaluated against Pretreatment 2-4 for resistance to Test 1 and 2. Cold-rolled panels (ACT Panels) were cleaned using Cleaner 1, rinsed with deionized water, and pretreated using a plastic pipette to coat evenly with the panels in a vertical orientation for 5 minutes at 27° C. Panels were then rinsed with deionized water and dried by for 5 minutes at 55° C. using forced air.

Pretreatments were evaluated by coating them with Paint 1 or Paint 2 curing as suggested above, and then subjecting them to 20 cycle hours GM-9511P (Test 1).

Samples were then scribed vertically and placed in Test 1 for 20 or 40 cycles.

TABLE 1

Corrosion Performance

| | Paint 1, 20 cycle GM9511P, mm | Paint 2, GM9511P, mm |
|---|---|---|
| Pretreatment 1 | 4.0 | 5.2 |
| Pretreatment 2 | 4.6 | 7.0 |
| Pretreatment 3 | 4.8 | 11.0 |
| Pretreatment 4 | 6.6 | 9.0 |

Example 2

Synthetic Clay Type

Pretreatment 1 was evaluated against Pretreatment 5 and 6 for resistance to Test 3 and 4. Cold-rolled panels (ACT Panels) were cleaned using Cleaner 1, rinsed with deionized water, and pretreated using a plastic pipette to coat evenly with the panels in a vertical orientation for 5 minutes at 27° C. A set of CRS (ACT) panels were cleaned using Cleaner 1, but without any additional pretreatment were included. Panels were then rinsed with deionized water and dried by for 5 minutes at 55° C. using forced air.

Pretreated and clean-only panels were evaluated by coating them with Paint 1 and curing as suggested above. Samples were then scribed vertically and placed in Test 3 for 500 hours and Test 4 for 20 cycles.

TABLE 2

| | Corrosion Performance | |
|---|---|---|
| | 500 hours B117, mm | 20 cycle GMW14872, mm |
| Pretreatment 1 | 2.6 | 4.4 |
| Pretreatment 5 | 20.0 | 5.0 |
| Pretreatment 6 | 11.0 | 4.8 |
| Cleaner 1 | 34.2 | 7.0 |

Example 3

Clay Type

The rheological effect of Laponite clay was compared to two other conventional clays. The rheology profiles of Pretreatments 7-9 were measured using a Paar-Physica MCR 301 Rheometer. The table below lists the viscosity as a function of shear rate. A high viscosity at low shear rate indicates that the Laponite material would be more likely to remain on vertical surfaces after application.

TABLE 3

| | Rheology profiles | | |
|---|---|---|---|
| Shear rate (1/s) | Pretreatment 7 (cP) | Pretreatment 8 (cP) | Pretreatment 9 (cP) |
| 0.01 | 518,000 | 1,180 | 29,300 |
| 0.1 | 38,100 | 501 | 2,960 |
| 1 | 3,760 | 71.8 | 294 |
| 10 | 708 | 4.59 | 34.6 |
| 100 | 153 | 1.95 | 6.64 |
| 1000 | 25.9 | 1.41 | 3.12 |

Pretreatment 7 was compared against Pretreatments 8 and 9 by applying them to cold-rolled panels (ACT Panels) that were cleaned using Cleaner 1, rinsed with deionized water. The pretreatments were applied using a plastic pipette to coat evenly with the panels in a vertical orientation at 27° C. After 5 minutes, both Pretreatment 8 and 9 started drying and the panels exhibited flash rusting. The panels were then rinsed with deionized water and dried by for 5 minutes at 55° C. using forced air. Pretreatment 7 did not exhibit any flash rusting.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

We claim:

1. A pretreatment composition for treating a metal substrate, that upon contact with the substrate, reacts with and chemically alters the substrate surface and binds to it to form a protective layer, comprising:
    (a) a solution of a group IIIB metal and/or a group IVB metal; and
    (b) a rheology modifier composition comprising colloidal layered silicate having an average diameter of from 1 nm to 30 nm.

2. The pretreatment composition of claim 1, wherein (a) the group IIIB metal and/or the group IVB metal comprises a compound of zirconium.

3. The pretreatment composition of claim 2, wherein the compound of zirconium comprises hexafluorozirconic acid, ammonium zirconium carbonate, zirconyl acetate, zirconyl nitrate, zirconyl carbonate, zirconyl sulfate, zirconyl chloride, zirconium carboxylate, hydrofluorozirconic acid, zirconium acetate, zirconium oxalate, ammonium zirconium glycolate, ammonium zirconium lactate, ammonium zirconium citrate, and/or mixtures thereof.

4. The pretreatment composition of claim 1, wherein the group IIIB metal and/or the group IVB metal is present in an amount from 150 ppm to 5000 ppm, measured on total elemental metal.

5. The pretreatment composition of claim 1, wherein (b) the rheology modifier composition is present in an amount of at least 1 percent by weight and no more than 10 percent by weight, based on the total weight of the pretreatment composition.

6. The pretreatment composition of claim 1, further comprising (c) a second rheology modifier.

7. The pretreatment composition of claim 1 further comprising (c) an electropositive metal that is not a group IIIB metal, a group IVB metal or a group VB metal.

8. The pretreatment composition of claim 1, wherein the pH of the pretreatment composition is from 2 to 8.

9. The pretreatment composition of claim 1, wherein the pretreatment composition is substantially free of organic materials.

10. The pretreatment composition of claim 1, wherein the pretreatment composition is completely free of organic materials.

11. A method for treating a metal substrate comprising contacting the substrate with a pretreatment composition according to claim 1.

12. A treated metal substrate formed according to the method of claim 11.

13. The treated metal substrate of claim 12, wherein a coating formed from the contacting has a thickness of less than 1 μm.

14. The treated metal substrate of claim 12, wherein a coating formed from the contacting has a thickness of from 1 nm to 500 nm.

15. A method for treating a metal substrate comprising spraying an outer surface of the metal substrate with the pretreatment composition according to claim 1, wherein said sprayed pretreatment composition gels upon contact with said outer surface.

16. A treated metal substrate formed according to the method of claim 15.

17. A method for forming a coated metal substrate comprising:
    (a) contacting the metal substrate with the pretreatment composition according to claim 1 to form a treated substrate; and (b) contacting the treated substrate with a coating composition comprising a film-forming resin.

18. The method of claim 17, wherein (a) contacting the metal substrate with the pretreatment composition comprises:
spraying an outer surface of the metal substrate with the pretreatment composition, wherein said sprayed pretreatment composition gels upon contact with said outer surface.

19. A method for forming a pretreatment composition comprising:
adding a rheology modifier composition comprising colloidal layered silicate having an average diameter of from 1 nm to 30 nm to an aqueous medium to form a solution;
adjusting the pH of the solution to 2 and 8 with an acid to form a pH adjusted solution; and then
adding a group IIIB and/or group IVB metal to the pH adjusted solution.

20. The method of claim 19, wherein the pretreatment composition is substantially free of organic materials.

* * * * *